United States Patent [19]
Park

[11] Patent Number: 5,956,412
[45] Date of Patent: Sep. 21, 1999

[54] LOUDSPEAKER CASE STRUCTURE FOR VIDEO DISPLAY APPLIANCES

[75] Inventor: Jong Man Park, Kyoungsangbuk-Do, Rep. of Korea

[73] Assignee: LG Electronics Inc., Rep. of Korea

[21] Appl. No.: 08/691,925

[22] Filed: Aug. 1, 1996

[30] Foreign Application Priority Data

Aug. 1, 1995 [KR] Rep. of Korea ............... 95-23692

[51] Int. Cl.⁶ .................................................. H04R 1/02
[52] U.S. Cl. ..................... 381/386; 381/388; 181/151; 181/199
[58] Field of Search .................. 381/386, 388, 381/166, 199; 181/151, 166, 207, 208, 199, 141, 198

[56] References Cited

U.S. PATENT DOCUMENTS

| | | | |
|---|---|---|---|
| 4,646,349 | 2/1987 | Puls | 381/24 |
| 5,400,408 | 3/1995 | Lundgren et al. | 381/88 |
| 5,682,021 | 10/1997 | Jeon et al. | 181/166 |

FOREIGN PATENT DOCUMENTS

| | | |
|---|---|---|
| 440551 | 8/1991 | European Pat. Off. . |
| 297010 | 7/1996 | United Kingdom . |
| WO9501077 | 1/1995 | WIPO . |
| WO9501078 | 1/1995 | WIPO . |

Primary Examiner—Curtis A. Kuntz
Assistant Examiner—Rexford N. Barnie
Attorney, Agent, or Firm—Christie, Parker & Hale, LLP

[57] ABSTRACT

A loudspeaker case structure for a video display appliance capable of damping and absorbing vibrations arising from the output of a loudspeaker to remove the howling phenomena produced on a cathode-ray tube by the transfer of the vibrations to the cathode-ray tube. The loudspeaker case structure includes a housing having a predetermined space for receiving the loudspeaker therein, dispersing and damping the vibrations from the loudspeaker through the space, and a supporting section, extending from the housing, for supporting and fixing the housing to a main bracket of a cabinet and absorbing the remaining vibrations passing through the housing.

6 Claims, 2 Drawing Sheets

LOUDSPEAKER CASE STRUCTURE FOR VIDEO DISPLAY APPLIANCES

BACKGROUND OF THE INVENTION

1. Field of the Invention

The present invention relates to a loudspeaker case structure for video display appliances. In particular, the present invention relates to a loudspeaker case structure for video display appliances which can absorb and dampen vibrations arising from the output of a loudspeaker and thus remove the howling phenomena produced due to the transfer of the vibrations directly to a cathode-ray tube, by improving the fastening structure of the loudspeaker.

2. Description of the Prior Art

Video display appliances such as monitors, televisions, etc., are typically provided with a cathode-ray tube (CRT). Such video display appliances are also provided with at least one loudspeaker for the output of sound.

FIG. 1 is a sectional view illustrating the structure of a conventional video display appliance in which a loudspeaker is installed. Referring to FIG. 1, a lug 3 of a CRT 2 is fastened to a cabinet boss 5 by a fastening screw 4 to fix the CRT 2 to a cabinet 1. Also, a loudspeaker 6 is fastened to another cabinet boss 8 by a fastening screw 7 to fix the loudspeaker 6 to the cabinet 1. Preferably, a plurality of loud speakers 6 may be installed in predetermined positions of the cabinet 1 to cause a surround-sound effect.

In the conventional video display appliance as constructed above, a video signal is displayed on the CRT 2, while a sound signal is outputted by the loudspeaker 6.

The sound waves produced from the loudspeaker 6 are composed of vibration components, and such vibrations are directly transferred to the CRT 2 through solid state media in the cabinet 1. This causes the howling phenomena to be produced on the screen of the CRT 2.

Specifically, in the event that the sound produced from the loudspeaker 6 becomes louder or several loudspeakers are provided in the video display appliance, greater vibrations are generated to intensify the howling phenomena produced on the screen of the CRT 2.

According to the conventional video display appliance, the CRT 2 and the loudspeaker 6 are directly fixed to the cabinet 1 to form a single bodied frame structure, and thus the vibrations produced from the loudspeaker 6 are not suppressed, but are directly transferred to the CRT 2.

Specifically, the vibrations produced from the loudspeaker 6 are transferred to the cabinet 1 through the screw 7 and the boss 8, and then are transferred to the CRT 2 through a cushion portion 1a of the CRT 2.

On the other hand, the vibrations produced from the loudspeaker 6 are also transferred to a panel 2a of the CRT 2 through another path composed of the boss 5, screw 4, and lug 3, and then to a shadow mask 2c through a frame 2b. At this time, three electron beams for red, green, and blue colors, which are emitted from electron guns 2d, are directed to the fluorescent screen of the CRT 2 through beam-passing apertures provided in the shadow mask 2c. If the vibrations are transferred to the shadow mask 2c through the frame 2b, the electron beams, which are emitted to the fluorescent screen of the CRT 2 through the beam-passing apertures of the shadow mask 2c, are affected by the transferred vibrations, thereby producing the howling phenomena on the display screen of the CRT 2.

The howling phenomena deteriorates the picture quality and the reliability of the appliance. Also, it fatigues the user's eyes easily.

SUMMARY OF THE INVENTION

It is an object of the present invention to solve the problems involved in the prior art, and to provide a loudspeaker case structure for a video display appliance which can absorb and dampen vibrations generated due to the output of a loudspeaker and thus remove the howling phenomena produced by the transfer of the vibrations directly to a cathode-ray tube (CRT).

In order to achieve the above object, the present invention provides a loudspeaker case structure for a video display appliance having a CRT for displaying a video signal thereon, at least one loudspeaker for outputting a sound signal, and a cabinet for fixing the CRT and the loudspeaker thereto, the loudspeaker case structure comprising:

a housing having a predetermined space for receiving the loudspeaker therein, the housing dispersing and damping vibrations generated from the loudspeaker through the space; and supporting means, extending from the housing, for supporting and fixing the housing to the cabinet.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
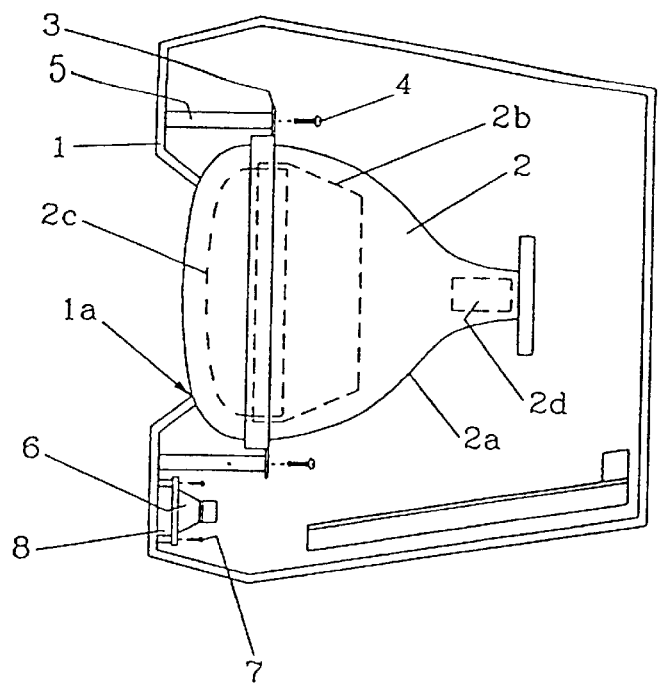
FIG. 1 is a sectional view illustrating the structure of a conventional video display appliance in which a loudspeaker is installed.
Figure 2:
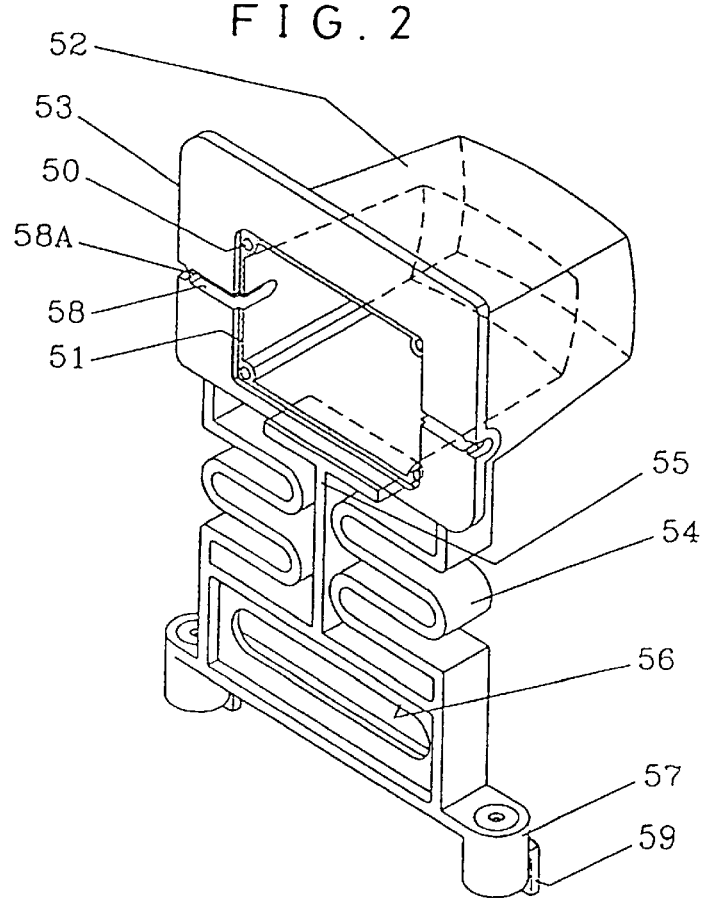
FIG. 2 is a perspective view of the loudspeaker case for a video display appliance according to an embodiment of the present invention.
Figure 3:
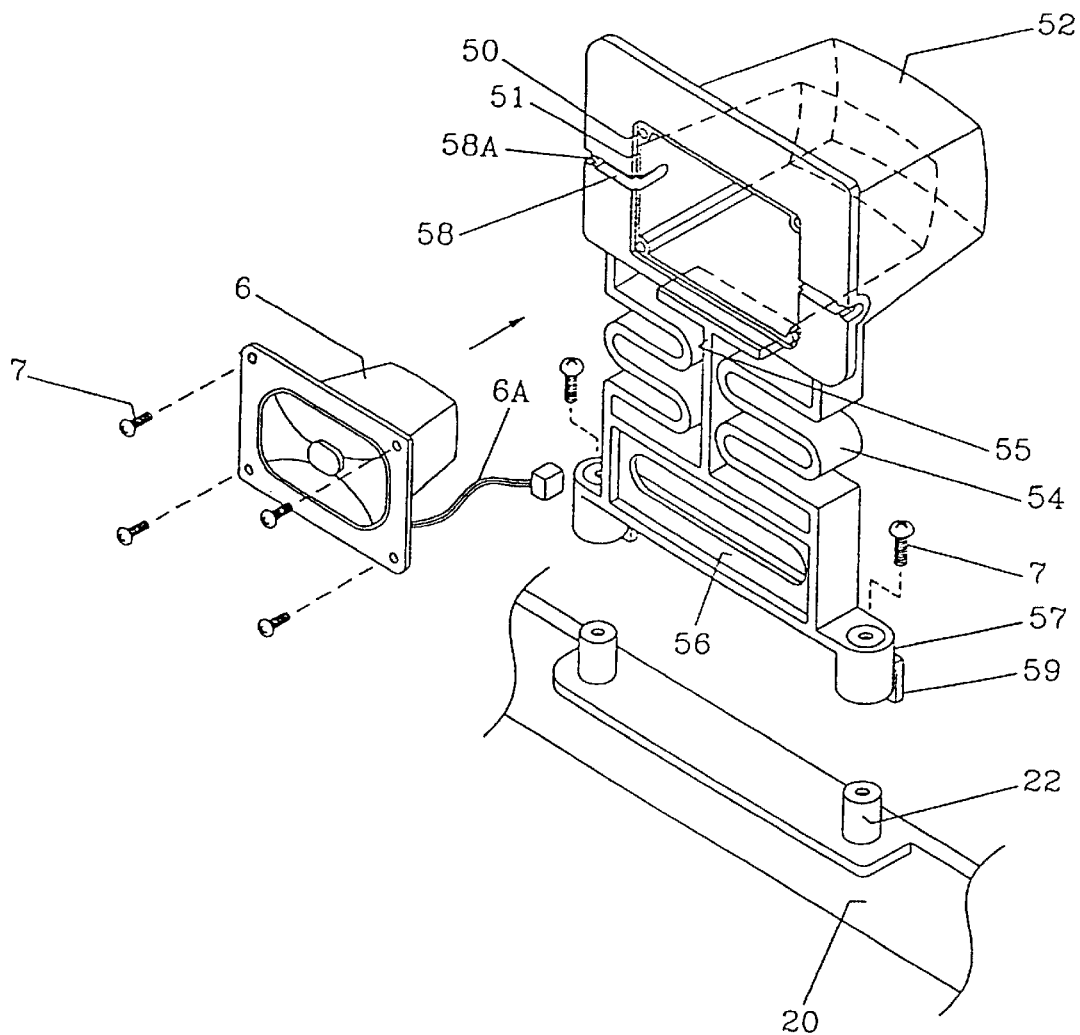
FIG. 3 is an exploded perspective view of the loudspeaker case of FIG. 2 illustrating its fastening work.
Figure 4:
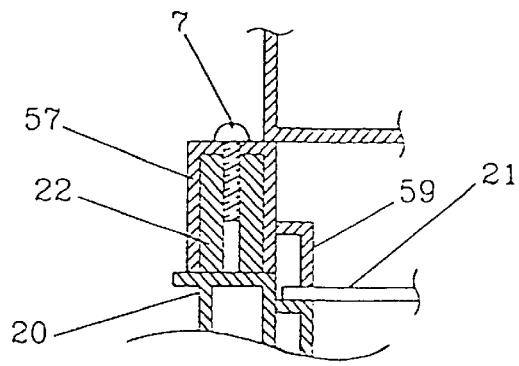
FIG. 4 is a sectional view illustrating the loudspeaker case fastened to a main bracket according to an embodiment of the present invention.

FIGS. 2, 3, and 4 show the loudspeaker case structure for a video display appliance according to an embodiment of the present invention.

Referring to FIGS. 2 and 3, the loudspeaker case according to the present invention comprises a CRT 2, a loudspeaker 6, a cabinet for fixing the CRT 2 and the loudspeaker 6 thereto, a housing having a predetermined space for receiving the loudspeaker 6 therein and dispersing and damping vibrations generated from the loudspeaker 6 through the space, and a supporting section 200, extending from the housing 100, for supporting and fixing the housing 100 to a main bracket 20.

The housing 100 is provided with a loudspeaker fastening portion 51 having fastening holes 50 and being fastened to a frame of the loudspeaker 6 by fastening screws 7, a damping portion 52 for receiving a yoke portion of the loudspeaker 6 therein to disperse and dampen the vibrations generated and propagated from the loudspeaker fastened to the loudspeaker fastening portion 51, and a shield plate 53, formed on the front of the damping portion 52, for preventing the vibrations propagated from the front of the loudspeaker 6 from leaking through the side portions of the damping portion 52.

The supporting section 200 is provided with an elastic absorbing rib portion 54, extending from the damping portion 52, for absorbing the vibration propagated from the loudspeaker 6 by its own elasticity, a supporting rib portion 55, extending from the damping portion 52 with the elastic absorbing rib portion 54, for preventing the damping portion 52 from drooping or being bent due to an external impact or an external temperature, a supporting body 56, formed on and extending from the elastic absorbing rib portion 54 and the supporting rib portion 55, for supporting the housing 100 and the rib portions 54 and 55, and fixing lugs 57, formed on the supporting body 56, for fixing the supporting body 56 to the main bracket 20.

On the shield plate 53 and the damping portion 52, a groove 58 is formed to draw therethrough lead wires 6A of the loudspeaker 6 which is fastened to the loudspeaker fastening portion 51, so that the lead wires 6A are connected to a circuit board 21. A projection 58A is formed on the end portion of the groove 58 to prevent the lead wires 6A drawn through the groove 58 from moving freely.

Further, on each side of the fixing lugs 57 are formed supporting projections 59 for supporting and fixing the circuit board 21 to the main bracket 20 when the damping portion 52 and the main bracket 20 are fastened together. The main bracket 20, which is provided in the video display appliance such as a monitor, a television receiver, etc., has fixing bosses 22 formed thereon for being fastened to the fixing lugs 57 by the fastening screws 7.

FIG. 3 is an exploded perspective view of the loudspeaker case explaining the fastening work in accordance with the present invention. FIG. 4 shows the fixing lug 57 and the fixing boss 22 which are fastened together.

According to the loudspeaker case structure according to the present invention as constructed above, the loudspeaker 6 is fastened in the housing 100, and then the housing 100 is fixed to the main bracket 20.

Referring to FIGS. 3 and 4, the loudspeaker 6 is first fastened to the loudspeaker fastening portion 51 by the fastening screws 7 after mating the fastening holes 7a formed on the frame of the loudspeaker 6 with the fastening holes 50 formed on the loudspeaker fastening portion 51. Thereafter, the fixing lugs 57 formed on the lower sides of the supporting body 56 are fastened to the main bracket 20 by the fastening screws 7.

In the state that the loudspeaker case according to the present invention has been fastened to the main bracket 20 of the monitor or the television set, the vibrations produced from the loudspeaker 6 is firstly dispersed and damped in the damping portion 52 of the housing 100. At the same time, the sound waves propagated from the front of the loudspeaker 6 are prevented from leaking through the sides portions of the damping portion 52 by the shield plate 53, thereby improving the sound quality of the loudspeaker 6.

The remaining vibrations passing through the housing 100 are transferred to and propagated along the elastic absorbing rib portion 54. During the propagation through the elastic absorbing rib portion 54, the vibrations are suppressed and absorbed by the elasticity of the elastic absorbing rib portion 54. The suppressed vibrations are then transferred to the main bracket 20 through the supporting body 56. However the remaining vibrations reaching the main bracket 20 are almost extinguished by the housing 100 and the supporting section 200 as described above, and do not affect the operation of the CRT, preventing the howling phenomena from being produced on the CRT.

In the embodiment, since the damping portion 52 is supported by the supporting rib portion 55 which extends between the damping portion 52 and the supporting body 56 with a predetermined length, and the fixing lugs 57 and the fixing bosses 22 are firmly fastened together by the fastening screw 7, the housing 52 is prevented from being bent or deformed due to the external impact or the severe change of the external temperature.

In fastening the loudspeaker case to the man bracket 20, the supporting projections 59 formed on the sides of the fixing lugs 57 serve to firmly support and fix the circuit board 21 to the main bracket 20. The lead wires 6A of the loudspeaker 6 are drawn through the groove 58 and is connected to the circuit board 21.

Form the foregoing, it will be apparent that the present speaker case structure provides advantages in that it can damp and absorb the vibrations generated from the output of the loudspeaker, and thus remove the howling phenomena produced by the transfer of the vibrations directly to the CRT since the vibrations generated from the loudspeaker are damped, absorbed, and become almost extinct during their propagation through the housing, elastic absorbing portion, and main bracket, thereby improving the picture quality and reliability of the product.

While the present invention has been described and illustrated herein with reference to the preferred embodiments thereof, it will be understood by those skilled in the art that various changes in form and details may be made therein without departing from the spirit and scope of the invention.

What is claimed is:

1. A loudspeaker case structure for a video display appliance having a cathode-ray tube for displaying a video signal thereon, at least one loudspeaker for outputting a sound signal, and a cabinet for fixing said cathode-ray tube and said loudspeaker thereto, said loudspeaker case structure comprising:

a housing having a predetermined space for receiving said loudspeaker therein, said housing dispersing and damping vibrations generated and propagated from said loudspeaker through said space; and supporting means, extending from said housing, for supporting and fixing said housing to said cabinet, said supporting means comprising an elastic absorbing rib portion, extending from said housing and having wrinkle-shaped bent portions, for absorbing said vibrations propagated from said loudspeaker and passing through said housing, a supporting rib portion, extending from said housing, for supporting said housing, and a supporting body, extending from said elastic absorbing rib portion and said supporting rib portion, and fixed to a main bracket in said cabinet.

2. A loudspeaker case structure as claimed in claim 1, wherein said housing comprises a damping portion for receiving a yoke portion of said loudspeaker therein with said predetermined space.

3. A loudspeaker case structure as claimed in claim 1, wherein said housing comprises a shield plate, fastened to a frame of said loudspeaker, for preventing said vibrations from said loudspeaker from leaking through side portions of said housing.

4. A loudspeaker case structure for a video display appliance having a cathode-ray tube for displaying a video signal thereon, at least one loudspeaker for outputting a sound signal, and a cabinet for fixing said cathode-ray tube and said loudspeaker thereto, said loudspeaker case structure comprising:

a housing having a predetermined space for receiving said loudspeaker therein, said housing dispersing and damping vibrations generated and propagated from said loudspeaker through said space, said housing further comprising a shield plate, fastened to a frame of the loudspeaker, for preventing said vibrations from said loudspeaker through side portions of the housing, said shield plate having at least one groove and projection formed thereon for drawing lead wires of said loudspeaker; and supporting means, extending from said housing, for supporting and fixing said housing to said cabinet, said supporting means comprising an elastic absorbing rib portion, extending from said housing and having wrinkle-shaped bent portions, for absorbing said vibrations propagated from said loudspeaker and passing through said housing, a supporting rib portion, extending from said housing, for supporting said housing, and a supporting body, extending from said elastic absorbing rib portion and said supporting rib portion, and fixed to a main bracket in said cabinet.

5. A loudspeaker case structure for a video display appliance having a cathode-ray tube for displaying a video signal thereon, at least one loudspeaker for outputting a sound signal, and a cabinet for fixing said cathode-ray tube and said loudspeaker thereto, said loudspeaker case structure comprising:

a housing having a predetermined space for receiving said loudspeaker therein, said housing dispersing and damping vibrations generated and propagated from said loudspeaker through said space, said housing comprising a shield plate, fastened to a frame of said loudspeaker, for preventing said vibrations from said loudspeaker from leaking through side portions of said housing, said shield plate having a least one groove and projection formed thereon for drawing lead wires of said loudspeaker; and supporting means, extending from said housing, for supporting and fixing said housing to said cabinet.

6. A loudspeaker case structure for a video display appliance having a cathode-ray tube for displaying a video signal thereon, at least one loudspeaker for outputting a sound signal, a cabinet for fixing said cathode-ray tube and said loudspeaker thereto, and a main bracket, provided in said cabinet, for supporting a circuit board, said loudspeaker case structure comprising:

a housing for receiving said loudspeaker; and supporting means, integrally formed with and extending from said housing, for supporting and fixing said housing to said main bracket, the supporting means comprising an elastic absorbing rib portion, extending from said housing and having wrinkle-shaped bent portions, for absorbing said vibrations propagated from said loudspeaker and passing through said housing, a supporting rib portion, extending from said housing, for supporting said housing, and a supporting body, extending from said elastic absorbing rib portion and said supporting rib portion, and fixed to said main bracket.

* * * * *